United States Patent [19]
Barbe

[11] Patent Number: 5,472,480
[45] Date of Patent: Dec. 5, 1995

[54] PROCESS FOR SUPPLYING NITROGEN BY MEANS OF SEMI-PERMEABLE MEMBRANES OR OF SEPARATORS OF GASES BY ADSORPTION

[75] Inventor: Christian Barbe, Fontenay-Aux-Roses, France

[73] Assignee: L'Air Liquide, Society Anonyme Pour l'Etude et l'Exploitation des Procedes Georges Claude, Paris, France

[21] Appl. No.: 275,404

[22] Filed: Jul. 15, 1994

[30] Foreign Application Priority Data

Jul. 22, 1993 [FR] France ................... 93 09060

[51] Int. Cl.⁶ .......................... B01D 53/04; B01D 53/22
[52] U.S. Cl. .................... 95/54; 95/117; 95/138
[58] Field of Search ................... 95/45, 47, 54, 95/117, 118, 138

[56] References Cited

U.S. PATENT DOCUMENTS

| | | | |
|---|---|---|---|
| 4,323,370 | 4/1982 | Leitgeb | 95/138 X |
| 4,348,213 | 9/1982 | Armond | 95/138 X |
| 4,376,640 | 3/1983 | Vo | 95/138 X |
| 4,415,340 | 11/1983 | Knoblauch et al. | 95/138 X |
| 4,576,614 | 3/1986 | Armond et al. | 95/138 X |
| 4,701,187 | 10/1987 | Choe et al. | 95/54 X |
| 4,894,068 | 1/1990 | Rice | 95/54 X |
| 5,102,432 | 4/1992 | Prasad | 95/54 |
| 5,140,471 | 8/1993 | Barbe et al. | 95/54 |
| 5,226,931 | 7/1993 | Combier | 55/16 |
| 5,266,101 | 11/1993 | Barbe et al. | 95/47 X |
| 5,284,506 | 2/1994 | Barbe | 95/54 X |
| 5,302,189 | 4/1994 | Barbe et al. | 95/54 |
| 5,346,536 | 9/1994 | Kaneshige et al. | 85/138 X |

FOREIGN PATENT DOCUMENTS 0517570  12/1992  European Pat. Off. .

*Primary Examiner*—Robert Spitzer
*Attorney, Agent, or Firm*—Young & Thompson

[57] ABSTRACT

A process for supplying nitrogen to at least two user stations, whose requirements as to nitrogen purity are different. Compressed air is passed from an air compressor (12) to at least one air treatment station (13) permitting effecting at least one of the following treatments of oil removal, filtering out a major portion of the particles, drying, and bringing the air to the desired temperature. The compressed air is then sent to a centralized gas separation unit (14), so as to produce at the outlet of the unit impure nitrogen of intermediate purity. The gas from the centralized separation unit (14) is directed to at least two utilization lines (3–5), each comprising a local gas separation unit (6–8), in which the gas is again treated, so as to obtain at the outlet of each local separation unit nitrogen of a purity suitable for the uses of each of the user stations (9, 10) at the end of the line.

13 Claims, 1 Drawing Sheet

PROCESS FOR SUPPLYING NITROGEN BY MEANS OF SEMI-PERMEABLE MEMBRANES OR OF SEPARATORS OF GASES BY ADSORPTION

FIELD OF THE INVENTION

The present invention relates to the supply of nitrogen of variable purity by means such as the deoxygenation of air by a membrane, or else the separation of oxygen from the air by preferential adsorption. The invention is applicable more particularly to the cases in which it is necessary to supply user stations whose requirements as to nitrogen purity (and therefore as to impurities of oxygen, water vapor . . . ) are very different.

BACKGROUND OF THE INVENTION

The production of nitrogen by means such as membranes or selective adsorption modules, in the two cases often called "on-site means", has been considerably developed in recent years, all over the world, complementarily to the conventional production by cryogenic means, for the following reasons:

these "on-site" means offer excellent security of supply;

low production costs;

the possibility of supplying, at very attractive costs, according to the applications in question, nitrogen of suitable purity, sometimes called "impure nitrogen", such that the residual oxygen concentration of the nitrogen can vary from several ppm (parts per million) to several %.

In the particular case of membranes, it is known that the membrane will react differently according to the temperature of the gas to be treated: thus it is known that at a high temperature (90° C. for example), the productivity of the membrane increases, but the nitrogen permeation also increases, which results in the worsening of the $O_2/N_2$ selectivity of the membrane. In this context, operation will most often be conducted under the following conditions:

To produce nitrogen of reduced purity (5% of residual oxygen for example), there will be used compressed air brought to a relatively high temperature (60° C. for example).

To produce nitrogen of high purity (1000 ppm of residual oxygen for example), there will be used compressed air brought to a relatively low temperature, often near ambient temperature or below.

At present the following different situations are encountered:

a) If the on-site nitrogen production system (which can be of the membrane or adsorption type) supplies only one user station, compressed air, from an air compressor, is first treated in a so-called treatment station comprising the steps of removing oil from the air, drying, filtering out the particles, and bringing to a desired temperature according to the above remarks. In a second stage, the obtained air, thus treated, is sent to a gas separation unit (of membrane or adsorption type) adapted to produce nitrogen required by the user station at the end of the line.

The situation becomes complicated when it is necessary to supply "impure" nitrogen (non-cryogenically), simultaneously, to several user stations requiring very different nitrogen purities. For example 95% $N_2$ (5% impurities) at a first station, 99% (1% impurities) at a second user station, and 99.9% (1000 ppm impurities) at a third station. The arrangements generally provided in this case are described below respectively at b), c) and d):

b) The case of a "central separation unit" or "single generator". In this case, among all the required purities, it will be chosen to produce nitrogen of the highest purity for all the stations, at the risk of providing "excessive quality" at certain stations. The configuration in question comprises a central separation unit (including an air compressor, an air treatment station, and an air separation unit), nitrogen of the selected purity from this central unit being sent by the central line to the different local supply lines, supplying the various user stations at the end of the chain.

It will be immediately apparent that this solution is a costly one, because the separation unit must perform enormous separation work because it will produce from the air nitrogen of high purity, to fulfill the requirement for the most exacting use. It is thus a cumbersome solution, not only as to the energy required, but also as to the required surface of the membrane when the separation technique used is membrane separation.

c) The second solution: the case of "multiple units of a compressed air network". The configuration is according to a preexisting compressed air network. It comprises a central air compressor, from which issues compressed air through a central line, this line supplying first a supply line for a compressed air user station, then in parallel a bundle of local distribution lines supplying several nitrogen user stations whose nitrogen purity requirements differ. Each local line comprises an air treatment station and a gas separation unit (whether of the membrane or adsorption type) adapted to the purity requirements of the user station at the end of the line.

Again it will be easily seen that this arrangement is not optimal, to the extent that each separation unit treats compressed air, because of the differences of purity (often called the "gap") of oxygen between the entering air and the leaving nitrogen, which can be high, and in particular the necessary large membrane surfaces when membrane technology is used for one of the separation stations. The energy used here, however, is moderate, but this advantage is generally counterbalanced by obtaining a product nitrogen pressure which is often relatively low (3 to $4\times10^5$ Pa) in this situation in which network air is available whose pressure is fixed by the usual compressed air requirements (6 to $7\times10^5$ Pa ordinarily sufficing).

d) The third solution sometimes used to solve this problem of multiple users/multiple purities under the name "autonomous multi units" is constituted in the following fashion: each line supplying a user station is autonomous, and comprises an air compressor, an air treatment station, and a local air separation unit adapted to the nitrogen requirements of the user station which is located at the end of the line, the nitrogen from each of these separation units being then directly sent to the corresponding user station.

Here again, this configuration has substantial drawbacks, connected to the useless multiplication of a certain number of stations; it will be noted in fact that for this solution a drawback connected to high investment exists, more than a high cost of operation.

For each of the four configurations described above (a), b), c), d)), it will be seen on the other hand that the separation unit directly treating the air for transforming it to oxygen with, as needed, a high purity "gap", the mixture obtained on the upstream side of the membrane is highly superoxygenated air, which is not without safety problems for the handling of this material.

SUMMARY OF THE INVENTION

The object of the present invention is to provide a process for supplying oxygen to a multiplicity of user stations whose requirements as to nitrogen purity are different, this process:

being more economical than the existing solutions (necessary energy balance, necessary membrane surface if this technique is utilized, investment cost);

permitting upgrading conventional membranes of different productivity and selectivity existing in the same lot of manufactured membranes or in different lots (manufacturing variances);

permitting operating under more satisfactory safety conditions on the upstream side of the membrane, when the membrane technique is selected for one of the steps, To do this, the process according to the invention starts with compressed air from an air compressor, this compressed air is first treated in at least one centralized air treatment oration, performing at least one of the following steps: removing oil from the air, filtering the major portion of the particles from the air, drying the air, end adjusting the temperature of the air, the separation of oxygen being then effected in two steps, a first centralized step in which from the air emerging from the treatment station, there is produced nitrogen of intermediate purity (relatively low), the assembly of the compressor plus treatment station plus gas separation unit being called the "central separation unit", the nitrogen obtained, of intermediate purity, at the outlet of this central unit, being directed toward the local supply lines of the different user stations, for which the required purity is different, each local line comprising a local gas separation unit adapted to the purity needs of the user station at the end of the line. There is thus effected a double separation stage.

As the gas separation unit, whether local or centralized, is meant according to the invention not only a separation unit constituted of membrane modules, but also a separation unit of the type for the preferential adsorption of oxygen relative to nitrogen on molecular sieves or like compounds or again combinations of these separations means. The gas separation technique by adsorption is particularly attractive to obtain high nitrogen purities. A central separation by the membrane technique has also the advantage of producing very dry nitrogen (characterized by a dew point at least as low as $-60°$ C.), its distribution thus giving rise to no condensation or gelation problem from residual humidity. The problems of conduit corrosion are also reduced.

By the expression "nitrogen of intermediate purity" obtained at the outlet of the central unit, there is meant a residual oxygen concentration within the range of 1% to 12%, preferably in the range of 3% to 7%.

The nitrogen purities obtained at the end of the chain can be very greatly variable according to the uses, being preferably within the range 500 ppm to 5% of oxygen in nitrogen.

When membrane technology Is selected, according to one aspect of the invention, for simplicity, as described above, there are no decentralized treatment stations for the local lines, therefore no specific temperature control per line. According to other aspects of the invention, there will be installed at each local line a treatment station permitting the selection of a specific temperature of the gas which will be treated by the line in question.

In such a case, there are preferably adopted the following temperature conditions:

for membrane modules located in the central separation unit, an air temperature within the range of 20° to 90° C., preferably within the range of 40° to 60° C.

when treatment centers are decentralized at the local lines, the gas will be treated before its arrival at the local membranes so that the temperature will be within the range $-60°$ C. to 90° C., and preferably within the range 15° C. to 50° C.

By membrane separation of gas, there is meant, according to the invention, any type of semi-permeable membrane having good properties for the separation of oxygen relative to nitrogen (selectivity) as is for example the case for membranes of the polyimide type or of the polysulfone type. There could also be used according to one of the aspects of the invention, membrane types that differ from one separation station to the other, according to the required purity.

As will be shown below by comparative examples, the process according to the invention offers a very attractive economical solution, although apparently more complicated. The process according to the invention permits controlling in two regions of the process (connected by two separation stages) precisely the separation performance, by the characteristics of the materials used (membrane or adsorption unit types). Each separation step uses a "gap" of reduced purity (air/nitrogen of intermediate purity in the first case, nitrogen of intermediate purity/nitrogen of improved purity in the second case), requiring for this reason a reduced membrane surface (when the membrane technique is used). According to the standard mode of practice of the invention, only the separation unit is decentralized and thus multiplied, resulting in an overall reduction of investment cost.

It will also be noted, given the "gap" of reduced purity at each separation stage, as indicated above, that the practice using one or more membrane modules, of permeation materials substantially less highly oxygenated, has for this reason less danger from the standpoint of safety.

BRIEF DESCRIPTION OF THE DRAWINGS

Other characteristics and advantages of the present invention will become apparent from the following description of embodiments given by way of non-limiting example, with respect to the accompanying drawings, in which.

DETAILED DESCRIPTION OF THE INVENTION

Figure 1:
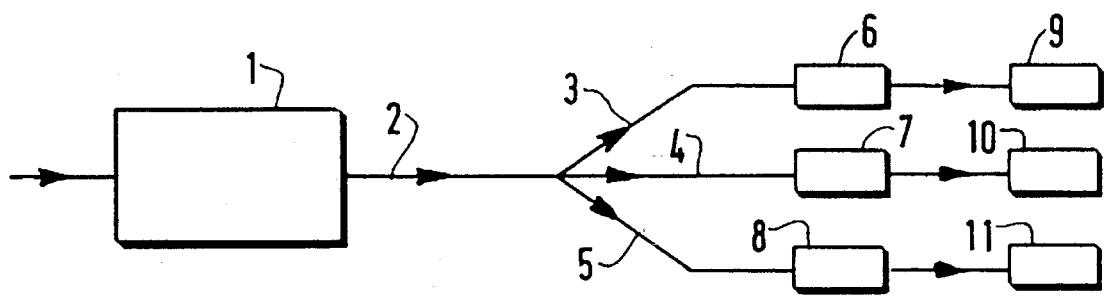
FIG. 1 is a schematic view of an installation using the process according to the present invention so as to supply simultaneously three user stations.

As shown in the drawings, the compressed air, from an air compressor 12 passes through a treatment station 13 which dries the air, removes oil, filters out particles and adjusts the temperature of the air. The compressed air from this treatment station is then directed toward a central gas separation unit 14 of the membrane type. The assembly of the compressor 12 plus the treatment station 13 plus the central separation unit 14 constitutes a central separation unit 1. This central unit produces nitrogen of intermediate purity, characterized by a residual concentration of oxygen within the range of 1 to 12%. This nitrogen is directed by the central line 2 toward three local lines 3, 4, 5 for supplying with nitrogen three user stations 9, 10, 11. Each local line comprises a local gas separation unit 6, 7, 8 of the membrane type from which emerge nitrogen streams of purities adapted to the user stations 9, 10, 11 located at the end of the line.

Given the different performances required of the membrane modules which are centralized or localized, it is possible to upgrade for these membrane separation units the membranes from a same fabrication lot of membranes or from different lots, but having variable performances because of a normal variation during manufacture.

The following example illustrates the present invention.

It constitutes a comparison of a process according to the invention with solutions of the prior art given above under b) ("single generator"), c) ("multiple units of a compressed air network"), d) ("autonomous multi units"), in the case of a chemical industry site in which it is necessary to supply three user stations with nitrogen, requiring different oxygen impurity levels:

A first station requiring a nitrogen flow of 50 Nm³/h containing a maximum of 1% oxygen.

A second station requiring a nitrogen flow of 10 Nm³/h containing a maximum of 0.1% oxygen.

A third station requiring a nitrogen flow of 100 Nm³/h containing a maximum of 2% oxygen.

Figure 2:
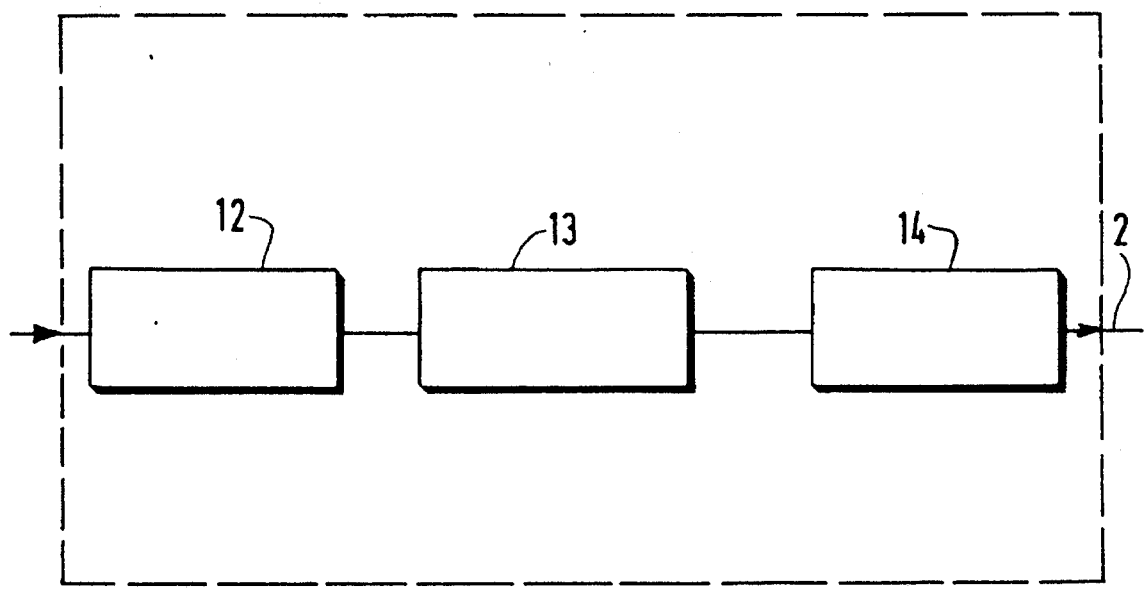
FIG. 2 is a schematic view of the central separation unit shown in FIG. 1.

This case is provided for by the invention, thanks to an installation such as that disclosed in FIGS. 1 and 2, wherein the compressed air is brought to a temperature of 50° C. before arriving at the centralized separation unit 14, the central unit 1 produces nitrogen of intermediate purity comprising a maximum oxygen content of 5%. The central unit uses membrane separation modules, of the polyimide membrane type. The three local separation units purify this intermediate nitrogen to a desired content at the end of each line. Each local unit uses also hollow fiber membrane whose active layer is a polyimide.

Table 1 compares the membrane surface installed and the energy consumption of the embodiment of the invention to that of the three other solutions described above, The data for the practice of the process according to the invention are relative to 100.

TABLE 1

|  | according to the invention | | single generator | | three autonomous units | | three units of compressed air | |
| --- | --- | --- | --- | --- | --- | --- | --- | --- |
|  | surface | energy | surface | energy | surface | energy | surface | energy |
| Unit A: 50 Nm³/h 1% | 18 | — | — | — | 29 | 39 | 65 | — |
| Unit D: 10 Nm³/h 0.1% | 11 | — | — | — | 16 | 19 | 35 | — |
| Unit C: 100 Nm³/h 2% | 19 | — | — | — | 40 | 59 | 90 | — |
| Central Unit | 52 | 100 | 252 | 231 | — | — | — | 80 |
| TOTAL | 100 | 100 | 252 | 231 | 85 | 117 | 190 | 80 |

Each solution uses membrane separation units with hollow fibers whose active layer is a polyimide, The air compressors are of the lubricated screw type.

The "single generator" solution: produces all the nitrogen requirements of the site at the highest required purity, namely 0.1% residual oxygen at the most. The air compressor produces air at $14 \times 10^5$ Pa absolute.

The "multiple units of a compressed air network" solution: The air compressor produces air at $8.5 \times 10^5$ Pa absolute.

The "multi autonomous units" solution: Each air compressor produces air at $14 \times 10^5$ Pa absolute.

Observation of the elements present in this table confirms the interest of the embodiment according to the invention. By comparison:

The "single generator" solution: the evaluation confirms what was previously indicated, namely the costly character of this solution, both as to energy, and as to the surface of the membrane to be used.

The "multiple units with compressed air network" solution: it will be seen here that this solution is particularly less advantageous as to the membrane surface used. The energy used remains acceptable, this advantage being however largely overbalanced by the low utilization pressure of the nitrogen products, as indicated above.

The "multi autonomous units" solution: here again, the figures confirm the fact that this solution is relatively consumptive of energy. If the surface used is relatively reduced, the investment cost is overall higher because of the multiplication of certain stations such as the oil remover or the air heater.

What is claimed is:

1. A process for supplying nitrogen to at least two user stations, whose requirements as to nitrogen purity are different, comprising the following steps:

a) passing compressed air to at least one air treatment station permitting effecting at least one of the following treatments of said compressed air:

oil removal;

filtering out a major portion of particles contained in said compressed air;

drying;

bringing said compressed air to a desired temperature;

b) sending the compressed air from step a) to a centralized gas separation unit, in order to produce, at an outlet of said centralized unit, an impure nitrogen gas of intermediate purity; and c) directing said impure nitrogen gas from said centralized unit to at least two utilization lines, each line having at its end one of the said user stations, and each line comprising a local gas separation unit, in which said impure nitrogen gas is treated, in order to obtain, at an outlet of each local gas separation unit, nitrogen of a purity suitable for the uses of said user station located at the end of said line.

2. A process according to claim 1, wherein said impure nitrogen gas obtained at the end of step b) has a residual oxygen content within the range 1% to 12%.

3. A process according to claim 1, wherein said impure nitrogen gas obtained at the end of step b) has a residual oxygen content within the range 3% to 7%.

4. A process according to claim 1, wherein said nitrogen obtained at an outlet of each of said local separation units has a residual oxygen content within the range 500 ppm to 5%.

5. A process according to claim 1, wherein at least one of said centralized or local gas separation units is of the membrane type.

6. A process according to claim 5, wherein said units of the membrane type use respectively membranes of varying characteristics.

7. A process according to claim 5, wherein at least one of said units of the membrane type uses membranes of the polyimide type.

8. A process according to claim 5, wherein the compressed air or the impure nitrogen gas treated in each gas separation unit of the membrane type is adjusted as to temperature.

9. A process according to claim 8, wherein the temperature imparted in the case of the centralized separation unit is different from the temperature imparted in the case of one of the local separation units.

10. A process according to claim 9, wherein:

for the central separation unit, the temperature of said compressed air is maintained within the range 20° C. to 90° C.; and for a local separation unit, the temperature of said impure nitrogen gas is maintained within the range −60° C. to 90° C.

11. A process according to claim 9, wherein for the central separation unit, the temperature of said compressed air is within the range 40° C. to 60° C.

12. A process according to claim 9, wherein for a local separation unit, the temperature of said impure nitrogen gas is within the range 15° C. to 50° C.

13. A process according to claim 1, wherein at least one of said centralized or local gas separation units is of the adsorption type.

* * * * *